United States Patent Office 3,639,573
Patented Feb. 1, 1972

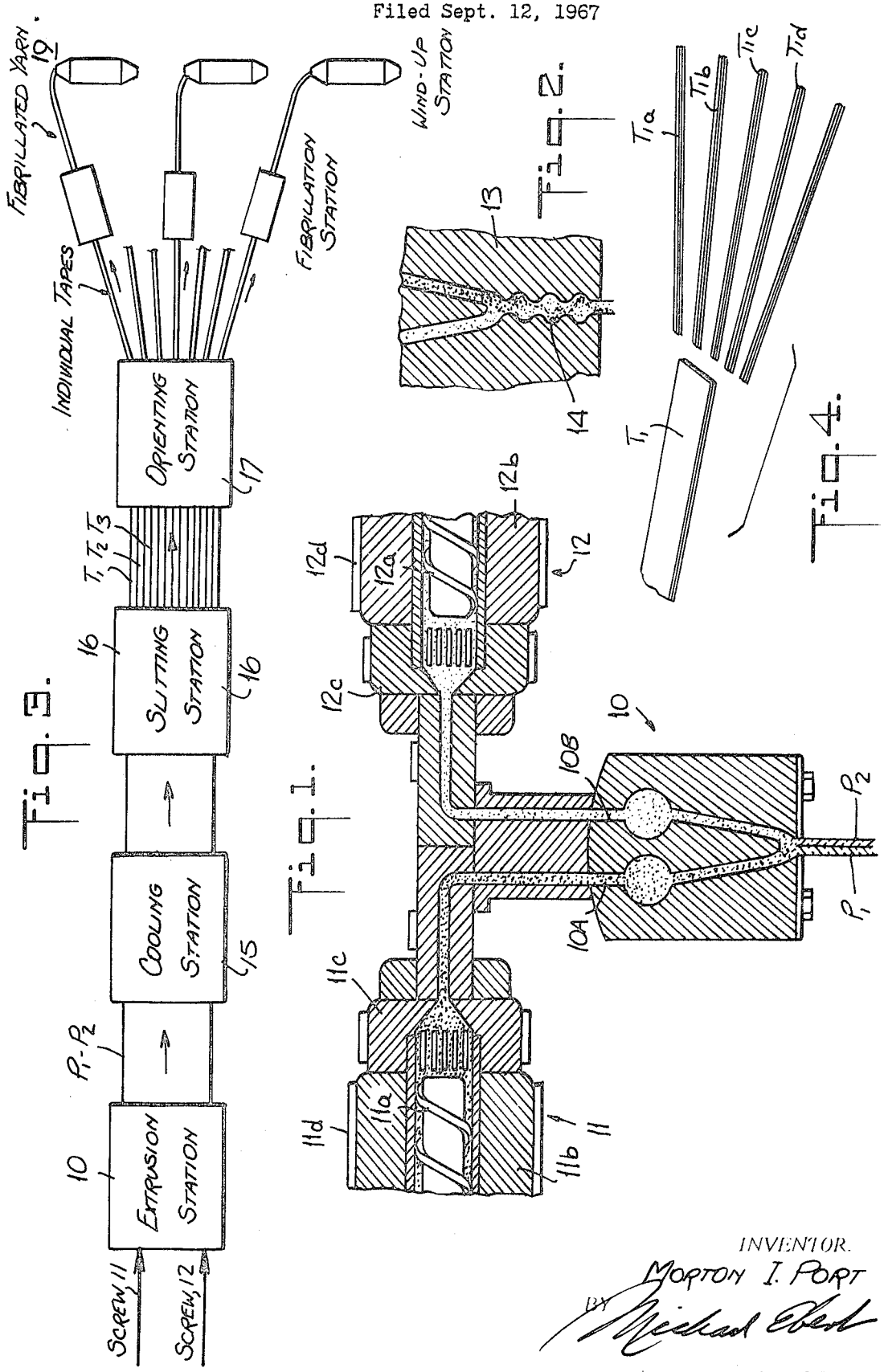

3,639,573
METHOD FOR MAKING A MULTICOLORED SPLIT POLYOLEFIN YARN
Morton I. Port, West End, N.J., assignor to Avisun Corporation, Philadelphia, Pa.
Filed Sept. 12, 1967, Ser. No. 667,140
Int. Cl. B29c 17/14; B29f 3/12
U.S. Cl. 264—75
8 Claims

ABSTRACT OF THE DISCLOSURE

A multicolored split yarn usable in decorative fabrics is produced by concurrently extruding at least two layers of polymeric material which are adapted to be differently colored, the layers being joined into a composite film-like web which is then slit into parallel tapes and stretch-oriented to produce mono-filament yarns of high strength, the yarns being fibrillated whereby each yarn is composed of a cluster of fine multicolored filaments whose edges are exposed as well as on the faces thereof.

RELATED APPLICATION

This application is related to application Ser. No. 378,179, of Port et al., filed June 26, 1964, and issued on Aug. 20, 1968 as Pat. 3,398,220.

This invention relates generally to yarns formed of polymeric materials, such as polyolefin resins and more particularly to multicolored split yarns, and to a technique for continuously making such yarns without intermediate winding and unwinding operations.

Polyethylene and polypropylene are members of the polyolefin family of chemically related resins. Both resins are thermoplastic and possess exceptional physical properties, such as light weight, flexibility, toughness, and high chemical resistance. Increasing use is being made of polyethylene and polypropylene, not only because of their superior physical properties, but also by reason of their relatively low cost.

Polypropylene is a polymer which is chemically related to polyethylene, but with a more complex polymer chain. Its main advantage over polyethylene is its very light weight, for polypropylene has a density range of 0.895 to 0.902 as compared to polyethylene's range of 0.910 to 0.965. This makes polypropylene the lightest of all commercially available plastic materials. Also polypropylene has much higher softening and melting points, which qualifies it for some yarn applications at temperatures above that of boiling water. In all other respects, both polyolefins are more or less compatible, for polypropylene and high-density polyethylene are high-strength, flexible materials which are chemically resistant.

While polyolefin yarns have many industrial applications, such as for sandbags, tarpaulins and carpet backings, it is also usable for decorative fabrics. Thus, colored polypropylene yarns may be employed as face or pile yarns in tufted rugs, and are usable also for making drapery and upholstery fabrics, and for other purposes calling for low-cost decorative yarns having superior physical properties.

Virgin polyolefin resins are a milky to almost clear, colorless product. However, these resins may be compounded with finely ground pigments which give the end product a distinctive or decorative color. Aside from black resin produced by the admixture of carbon black, it is also possible to make colored yarns in which the polyolefin resin is blended with blue, gold, orange, white, and other pigments. By varying the pigment concentration, the color effect in the end product may be caused to range from translucent to opaque. Some pigments also improve the resistance of the basic resin to weathering and sunlight.

In order to produce a yarn which when woven or knitted provides a fabric having a soft hand, it is known to fibrillate a ribbon-like yarn or tape into a cluster of individual fine filaments. In producing multicolored, fibrillated or split yarns usable, for example, as a face yarn for tufted carpets, the present practice is first to make mono-filament polyethylene or polypropylene tapes of different colors, which tapes are then oriented and fibrillated. The resultant split yarns formed of fine filaments are thereafter twisted together to produce an attractive multicolored blended yarn. This elaborate technique, because of the many steps involved, adds substantially to the ultimate cost of the yarn.

Accordingly, it is the main object of this invention to provide a relatively low-cost, multicolored split yarn of polymeric material which is produced by a technique which is less complicated and more efficient than techniques previously employed to make such yarns and in which the multicolor effect is enhanced. While the invention will be described mainly in conjunction with polyolefins, it is to be understood that the principles thereof are applicable to a wide range of polymeric materials, such as nylon and polyesters.

More specifically, it is an object of this invention to provide a technique for making a multicolored split yarn which is continuous and which proceeds without interruption from extrusion to the final winding of the yarn into packages, and without the need for ply-twisting yarns of different color.

Also an object of the invention is to provide a multicolored yarn in which the various colors thereof are randomly blended rather than in distinct layers, to afford marbleizing and other flowing and unusual decorative effects not heretofore attainable.

Still another object of the invention is to provide a split yarn formed by filaments having multiple layers which are adapted to accept different colors when cross-dyed to produce a multicolored yarn.

Briefly stated, these objects are attained in a continuous system employing a multichambered extrusion die into which differently colored polyolefin materials are introduced, the material being extruded as viscous films which are joined to form a multi-ply composite web, the web being cooled or quenched and then slit into parallel tapes which are stretch-oriented to produce mono-filament yarns of high tensile strength, which yarns are then fibrillated into fine filament clusters, each filament of which is multicolored, the fibrillated yarns being wound into packages.

For a better understanding of the invention as well as further objects and features thereof, reference is made to the following detailed description to be read in conjunction with the accompanying drawing, wherein:

FIG. 1 is a sectional view of a multichambered die for producing a composite web material in accordance with the invention;

FIG. 2 is a modified form of die to produce a multicolored yarn in which the colors are randomly blended;

FIG. 3 is a block diagram showing a continuous system for producing yarns in accordance with the invention; and FIG. 4 shows one ribbon-like yarn produced by the system as it appears before and after fibrillation.

EXTRUSION

Referring now to the drawing, and more particularly to FIG. 1, there is shown a multichambered die 10, which is supplied with two streams of molten polyolefin material having the same chemical composition but being differently colored. While the invention is not limited thereto, polypropylene shall hereafter be cited as an example of the resin fed into the die.

Die 10 cooperates with a pair of extruder screw assemblies 11 and 12 of standard design. As is conventional, polypropylene stock in granular form is fed into the hopper of each screw assembly and drops through the feed throat of the hopper into the channel of a screw (11a and 12a) rotating within the hardened liner of the extruder barrel or cylinder (11b and 12b), the material being forced forward by the flight of the rotating screw. As the material moves, it is heated, melted and compressed by a series of complicated flow patterns inside the screw channel.

Intermingled with the polypropylene fed into screw assemblies 11 and 12, are differently colored pigments, say blue and orange powders, so that the melt produced in screw 11 is blue-colored, and that in screw 12 is orange-colored.

The melt passes through the screen pack and supporting breaker plate mounted in the adapter (11c and 12c). The screen pack serves primarily as a filter for foreign matter that may have gotten into the stock. It also increases back pressure in the extruder barrel. Heat which softens the resin is supplied by external heating means, such as electrical heaters (11d and 12d) and by internal frictional forces generated by the compressing action of the screw.

To produce a composite web having two or more differently colored plies of polypropylene, die 10 is multi-chambered. In the example shown involving only two plies, die 10 is provided with two entrance ports 10A and 10B which admit the two melt streams from extruder screw assemblies 11 and 12 into passages conveying the material to a common die orifice where the layers of molten material combine and interbond to form a composite film web.

The die is of the type generally used for extruding unsupported flat film. Desirable flow paths may be achieved through the use of a tear-drop shaped feed manifold which slopes downwardly from the entry port toward the die lips at the orifice thereof. This provides a path of decreasing resistance to flow across the die from the feed port to the orifice which compensates for the additional length of travel and equalizes the rate of exit from the die lips. Control of flow rate and film thickness may be accomplished by adjustment of the lip opening and by means of zoned temperature control. Internal surfaces are preferably high polished.

It is to be understood that in lieu of a multichambered die having a common orifice, two or more distinct dies may be used in conjunction with a corresponding number of screws, the die orifices being aligned one above the other to produce superposed layers of plastic material which combine while still hot and soft at the output to produce a composite web.

Thus emerging from the die orifice is a composite web of viscous resin having two distinct layers or plies $P_1$ and $P_2$ of contrasting color (Orange and Blue). It is also possible to effect random blending of the two colors rather than distinct or striated layers thereof. This is accomplished, as shown in FIG. 2, by means of a die 13 also having two chambers as in the previous example, the two molten streams converging into a sinuous passage 14 leading to the common orifice. The two streams interact within the sinuous passage to effect random blending of the two colors. Similar effects resulting in marbleizing, may be achieved by varying the flow velocities of the melt (i.e., plug, streamline or turbulent), whereby the colors are caused to intermingle in random fashion so that the colors appear to flow and blend together rather than to appear in sharply defined layers.

Alternatively, the composite web may be produced by blown-film extrusion, using a die having concentric rings for introducing the differently colored melts into a common orifice from which the materials are extruded in tubular form. This tubular extrusion is composed of concentric layers having different colors and is inflated by air pressure into a bubble which is thereafter flattened to form the composite web.

YARN-PRODUCING SYSTEM

Referring now to FIG. 3, there is shown a continuous system in accordance with the invention for creating a split, multicolored yarn formed of polymeric material such as polypropylene or other polyolefin material. In the drawing, emerging from die 10 is a web $P_1$–$P_2$ whose two plies have different colors.

Polyethylene is a crystalline resin and produces the toughest extrudate when quickly cooled. Rapid quenching prevents the development of large crystals, which tend to embrittle the material. Polypropylene material is cooled and handled in much the same manner as polyethylene. Since polypropylene is even more crystalline, rapid quenching becomes of the utmost importance.

The composite film web $P_1$–$P_2$ emerging from die 10 may be quickly cooled either by chill-rolls or by an air blast, or quenched in a water bath, in a cooling station 15. When water-quench cooling is used, the die is brought as close to the water surface as possible. After the composite web has been cooled, the edges are trimmed. The thickness of the polypropylene may be varied in accordance with requirements, each layer therein being, for example, in the order of one-tenth of a mil to ten mils in thickness, and is preferably one-half to two mils thick.

The film web from cooling station 15 is conveyed by suitable rollers to a slitting station 16, in which the web passes under a bank of circular slitting knives on a common shaft, or is subjected to other slitting means which act to cut the web into parallel tapes $T_1$, $T_2$, $T_3$, etc. In practice, the web may be cut into two or more tapes, the number depending, of course, on the yarn size desired.

The parallel tapes emerging from slitting station 16 then pass through an orientation station 17 provided with a heating zone and input and output godet rollers, whereby the tapes are heated and stretched to an extent producing molecular monoaxial orientation which greatly improves the tensile strength of the tapes. It is known that molecular orientation can be imparted to various organic synthetic polymers of high molecular weight, by stretching. This is best done while heating the material to a temperature close to its melting point.

It is also known that the orientation greatly facilitates the subsequent fibrillation of the tape material, for any sharp mechanical shock imparted to the oriented structure tends to split the tape longitudinally. Thus the oriented tapes from the orientation station 17 are fed into a fibrillating station 18 which may be of any known type, such as rotating brushes, twisting means, air jets, or acoustic devices, to cause the oriented tapes to break up into individual fine filaments, thereby producing multifilament yarns. These yarns may then be wound on spindles into packages at wind-up station 19. Alternatively, the slitting action may take place after orientation.

Various forms of fibrillation techniques are disclosed in the Pats. 3,165,563 (Rasmussen), 3,181,224 (Tanner), 2,980,982 (Costa) and 3,242,035 (White).

Thus as shown in FIG. 4, mono-filament tape $T_1$ after fibrillation, is split into a cluster of separate fine filaments $T_{1a}$, $T_{1b}$, $T_{1c}$, $T_{1d}$, etc., each of which is composed of two plies having different colors, i.e., blue and orange. These filaments display their colors not only on the faces of the plies, but also along the exposed edges thereof. Consequently, the color effect is enhanced in the split yarn, for the color is not merely a surface effect but appears to arise from within the body of the yarn.

APPLICATIONS

It is important to note that the system disclosed herein provides a continuous process in which the raw plastic material is extruded into a composite web which is cooled, slit, oriented, and fibrillated, without the need to wind and rewind the web at any intermediate point in the process, and without the need for intertwisting. The system can also be operated discontinuously in a two stage arrangement wherein the web is wound after being quenched and cooled and is thereafter unwound for orientation and fibrillation.

It will be appreciated that the split yarn may be used for many decorative purposes, such as for draperies and upholstery, as well as for face yarns in tufted rugs. It is also possible to make secondary backings for tufted rugs which, because of their decorative qualities, may be reversed.

The invention lends itself to the production of split yarns having as many as four or five colors and it is possible to adjust the relative thickness of the colored plies to cause one or more colors to be dominant, while the others have a minor value, thus opening up a new range of decorative possibilities. Some of the colors, by adjustment of the concentration of the pigment may be given an opaque quality while others appear more or less translucent. Flecked effects may be obtained by interrupting the supply of the pigment intermittently to produce discrete colored and non-colored areas along the filaments.

ALTERNATIVE TECHNIQUES

Instead of introducing color in the course of making the split yarn, the layers of the composite web may be made of different polymeric materials, such as polyester, acrylic and nylon, whereby the layers in the filaments forming the split yarn are then of dissimilar materials which may be selectively dyed. Or one layer may be of polypropylene having pigment incorporated therein, whereas another layer may be of nylon or other material which may be later piece dyed without affecting the color of the polypropylene layer.

Also the split yarn may be texturized before being wound into packages. This may be done with gear crimping or other known texturizing techniques. If the layers in the filaments are of dissimilar material or materials having differential shrinkages properties, texturization may be effected simply by the use of heat or steam.

While there has been shown a preferred technique in accordance with the invention, it is to be understood that many changes and modifications may be made therein without departing from the spirit of the invention as defined in the annexed claims.

What I claim is:

1. A method for producing a multicolored split thermoplastic yarn to be woven or knitted into a fabric comprising the steps of:

(A) concurrently extruding at least two layers of polymeric material possessing different colors,
(B) combining said differently colored layers into a composite film web,
(C) slitting said web into parallel mono-filament multilayer tapes,
(D) stretch-orienting said tapes to produce ribbon-like yarns, and
(E) fibrillating each of said yarns to form a cluster of fine filaments whose multilayer edges are exposed as well as the faces thereof to provide a multicolored yarn in which colors are displayed both by said faces and said sides, whereby the color effects appear to rise from the body of the yarn.

2. A method as set forth in claim 1 wherein said layers are of polyolefin material having differently colored pigments mixed therein.

3. A method as set forth in claim 2, wherein said material is polypropylene.

4. A method as set forth in claim 2, wherein said material is high-density polyethylene.

5. A method as set forth in claim 1 wherein said materials are selected from the class constituted by nylon, polyester and acrylics.

6. A method as set forth in claim 1, wherein said layers of material are combined under conditions causing interflow therebetween to produce marbleizing color effects.

7. A method as set forth in claim 1, wherein said steps are effected continuously without winding and unwinding.

8. The method set forth in claim 1, further including the step of texturizing each of the fibrillated yarns.

References Cited

UNITED STATES PATENTS

| | | | |
|---|---|---|---|
| 2,614,288 | 10/1952 | Chavannes | 264—147 |
| 3,003,304 | 10/1961 | Rasmussen | 264—UX |
| 3,323,978 | 6/1967 | Rasmussen | 264—UX |
| 3,336,174 | 8/1967 | Dyer et al. | 264—UX |
| 3,397,428 | 8/1968 | Donald | 264—171 X |
| 3,398,220 | 8/1968 | Port et al. | 264—UX |
| 3,422,175 | 1/1969 | Rowland | 264—171 UX |

ROBERT F. WHITE, Primary Examiner

A. M. SOKAL, Assistant Examiner

U.S. Cl. X.R.

264—147, 171, DIG. 47; 28—DIG. 1